(12) United States Patent
Fujita et al.

(10) Patent No.: US 10,192,522 B2
(45) Date of Patent: Jan. 29, 2019

(54) MULTI-LAYERED DISPLAY DEVICE

(71) Applicant: Yazaki Corporation, Tokyo (JP)

(72) Inventors: Sunao Fujita, Shizuoka (JP); Takao Kanai, Shizuoka (JP); Takayuki Ogawa, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 92 days.

(21) Appl. No.: 14/976,614

(22) Filed: Dec. 21, 2015

(65) Prior Publication Data
US 2016/0189345 A1    Jun. 30, 2016

(30) Foreign Application Priority Data
Dec. 24, 2014  (JP) .................. 2014-260373

(51) Int. Cl.
G09G 5/12    (2006.01)
B60K 37/02   (2006.01)
(Continued)

(52) U.S. Cl.
CPC ............... *G09G 5/12* (2013.01); *B60K 35/00* (2013.01); *B60K 37/02* (2013.01); *G09G 3/001* (2013.01); *B60K 2350/1064* (2013.01); *B60K 2350/1072* (2013.01); *B60K 2350/1096* (2013.01); *B60K 2350/2017* (2013.01); *B60K 2350/962* (2013.01); *G06F 3/1423* (2013.01);
(Continued)

(58) Field of Classification Search
CPC ....... G06T 19/006; G06T 15/04; G06T 17/10; G06T 7/0081; G06T 7/20; G06T 2207/20112; G06T 2207/30242; G06F 3/012
See application file for complete search history.

(56) References Cited

U.S. PATENT DOCUMENTS

| 6,333,697 | B1* | 12/2001 | Kumazawa | B60K 37/02 340/458 |
| 2003/0056608 | A1* | 3/2003 | Ishimaru | B60K 37/02 73/866.3 |
| 2003/0099160 | A1* | 5/2003 | Ueno | G04C 17/00 368/82 |
| 2005/0212669 | A1 | 9/2005 | Ono et al. | |

(Continued)

FOREIGN PATENT DOCUMENTS

| JP | 4568087 B2 | 10/2010 |
| JP | 2012-32286 A | 2/2012 |
| JP | 5239925 B2 | 7/2013 |

OTHER PUBLICATIONS

J-Plat Pat English translation of JP 2012-32286 A.*

*Primary Examiner* — William A Beutel
(74) *Attorney, Agent, or Firm* — Sughrue Mion, PLLC

(57) ABSTRACT

A display device includes a first display surface displaying vehicle information; and a second display surface which is disposed facing the first display surface and transmits light, has a drawing pattern drawn across a display area and outside the display area of the first display surface when seen from a direction in which the second display surface is stacked on the first display surface, and can switch to a displayed state in which the drawing pattern is displayed and a hidden state in which the drawing pattern is hidden. The display device displays information by the first display surface and the second display surface. The display device can therefore realize a visual effect that makes the display area look relatively large.

18 Claims, 10 Drawing Sheets

(51) Int. Cl.
  *G09G 3/00*   (2006.01)
  *B60K 35/00*  (2006.01)
  *G06F 3/14*       (2006.01)
  *G09G 3/04*       (2006.01)
  *G09G 3/20*       (2006.01)

(52) U.S. Cl.
  CPC .............. *G09G 3/04* (2013.01); *G09G 3/20* (2013.01); *G09G 2300/023* (2013.01)

(56) References Cited

U.S. PATENT DOCUMENTS

| | | | |
|---|---|---|---|
| 2006/0083476 A1* | 4/2006 | Winkler | G02B 6/0018 385/146 |
| 2006/0158320 A1* | 7/2006 | Shibata | B60K 37/02 340/425.5 |
| 2009/0180272 A1* | 7/2009 | Tsurumi | B60K 35/00 362/23.16 |
| 2012/0188792 A1* | 7/2012 | Matsumoto | G02B 6/0036 362/613 |

* cited by examiner

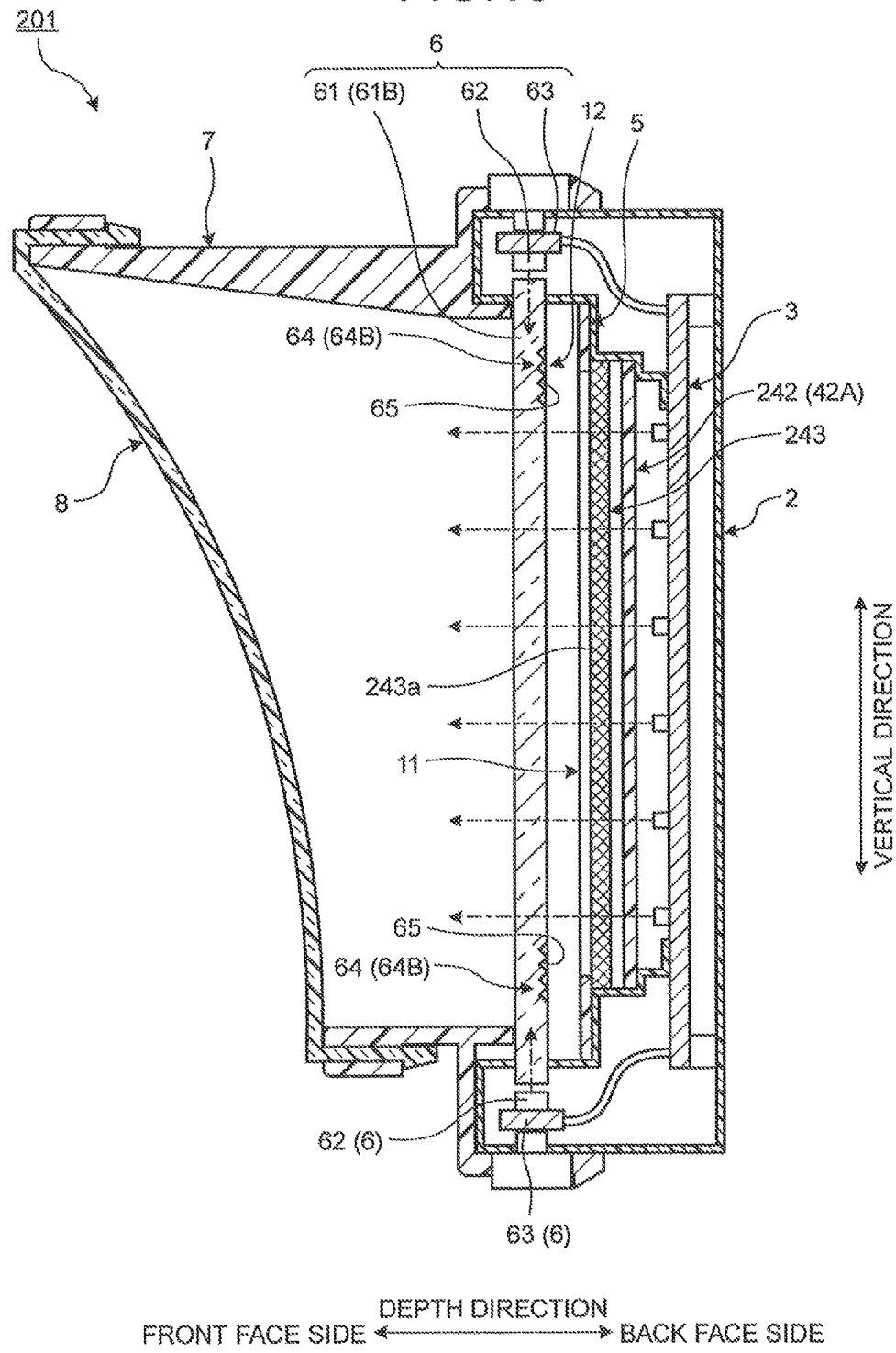

MULTI-LAYERED DISPLAY DEVICE

CROSS-REFERENCE TO RELATED APPLICATION(S)

The present application claims priority to and incorporates by reference the entire contents of Japanese Patent Application No. 2014-260373 filed in Japan on Dec. 24, 2014.

BACKGROUND OF THE INVENTION

1. Field of the Invention

The present invention relates to a display device.

2. Description of the Related Art

As a display device mounted in a vehicle or the like of the related art, Japanese Patent Publication No. 4568087 discloses a vehicle display device including a display with a display area and a ring-shaped display partition member which is arranged over a part of the display area of the display, where various pieces of information indicating a state of a vehicle is displayed in the display area. The vehicle display device realizes well-defined display with increased stereoscopic effect by attaching a magnifying lens to an opening of the ring-shaped display partition member and allowing the ring-shaped display partition member to move over the display area.

Now, the vehicle display device disclosed in Japanese Patent Publication No. 4568087 has room for further improvement in terms of making the display area look larger since, for example, the movement of the ring-shaped display partition member is restricted within the display area of the display where a part of the display area is hidden by the ring-shaped display partition member when the ring-shaped display partition member is moved to any position.

SUMMARY OF THE INVENTION

The present invention has been made in view of the aforementioned circumstances, and an object of the present invention is to provide a display device capable of realizing a visual effect that makes a display area look relatively large.

In order to achieve the above mentioned object, a display device according to one aspect of the present invention includes a first display surface configured to display vehicle information; and a second display surface configured to be disposed facing the first display surface and to transmit light, have a drawing pattern drawn across a display area and outside the display area of the first display surface when seen from a direction in which the second display surface is stacked on the first display surface, and be able to switch to a displayed state in which the drawing pattern is displayed and a hidden state in which the drawing pattern is hidden, wherein the display device displays information by the first display surface and the second display surface.

According to another aspect of the present invention, in the display device, it is possible to configure that the first display surface and the second display surface display at least one piece of information in which the vehicle information and the drawing pattern are coordinated with each other.

According to still another aspect of the present invention, in the display device, it is possible to configure that the first display surface includes a rectangular display area, and the drawing pattern includes an arc portion jutting from the rectangular display area of the first display surface to the outside of the display area.

According to still another aspect of the present invention, in the display device, it is possible to configure that the first display surface displays an image of a pointer needle as the vehicle information, and the drawing pattern includes an indication part which is provided around the image of the pointer needle and pointed at by the image of the pointer needle.

According to still another aspect of the present invention, in the display device, it is possible to configure that the second display surface includes an indentation part forming the drawing pattern and can switch to the displayed state in which the drawing pattern is displayed by light radiated from a light source and the hidden state in which the drawing pattern is hidden by turning off the light source.

According to still another aspect of the present invention, in the display device, it is possible to configure that the first display surface displays an image of the vehicle information by light polarized in one direction, and the indentation part is a groove which is formed on the second display surface and extends in a direction intersecting a polarization direction of the polarized light.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a cross-sectional view of a display device according to a variation.

DETAILED DESCRIPTION OF THE PREFERRED EMBODIMENTS

Embodiments of the present invention will now be described in detail with reference to the drawings. The present invention is not to be limited by the embodiments. Moreover, a component in the following embodiments includes one that can be easily replaced by those skilled in the art or one that is substantially the same.

EMBODIMENT

Figure 1:
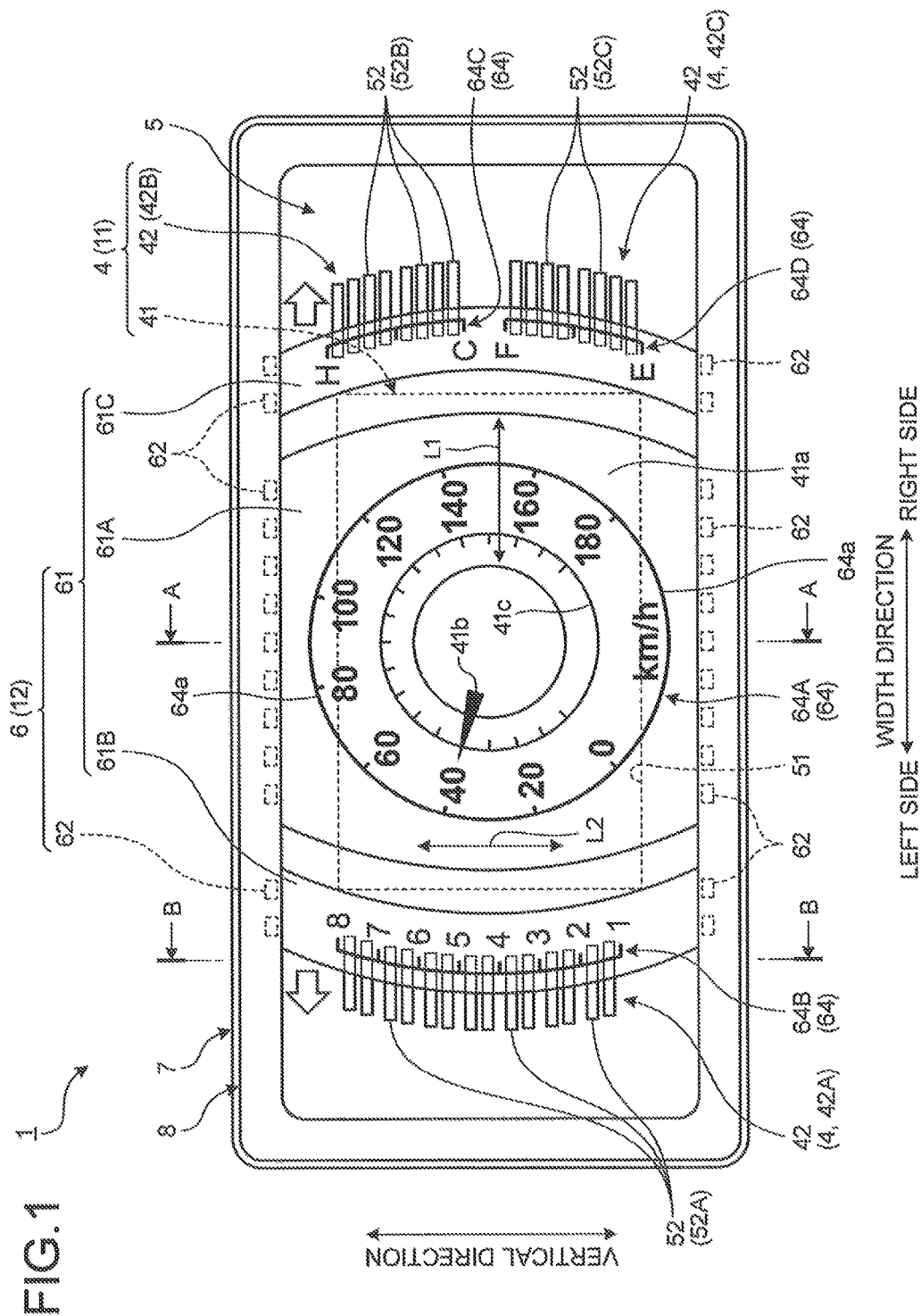
FIG. 1 is a front view of a front face side of a display device in a depth direction according to an embodiment.
Figure 2:
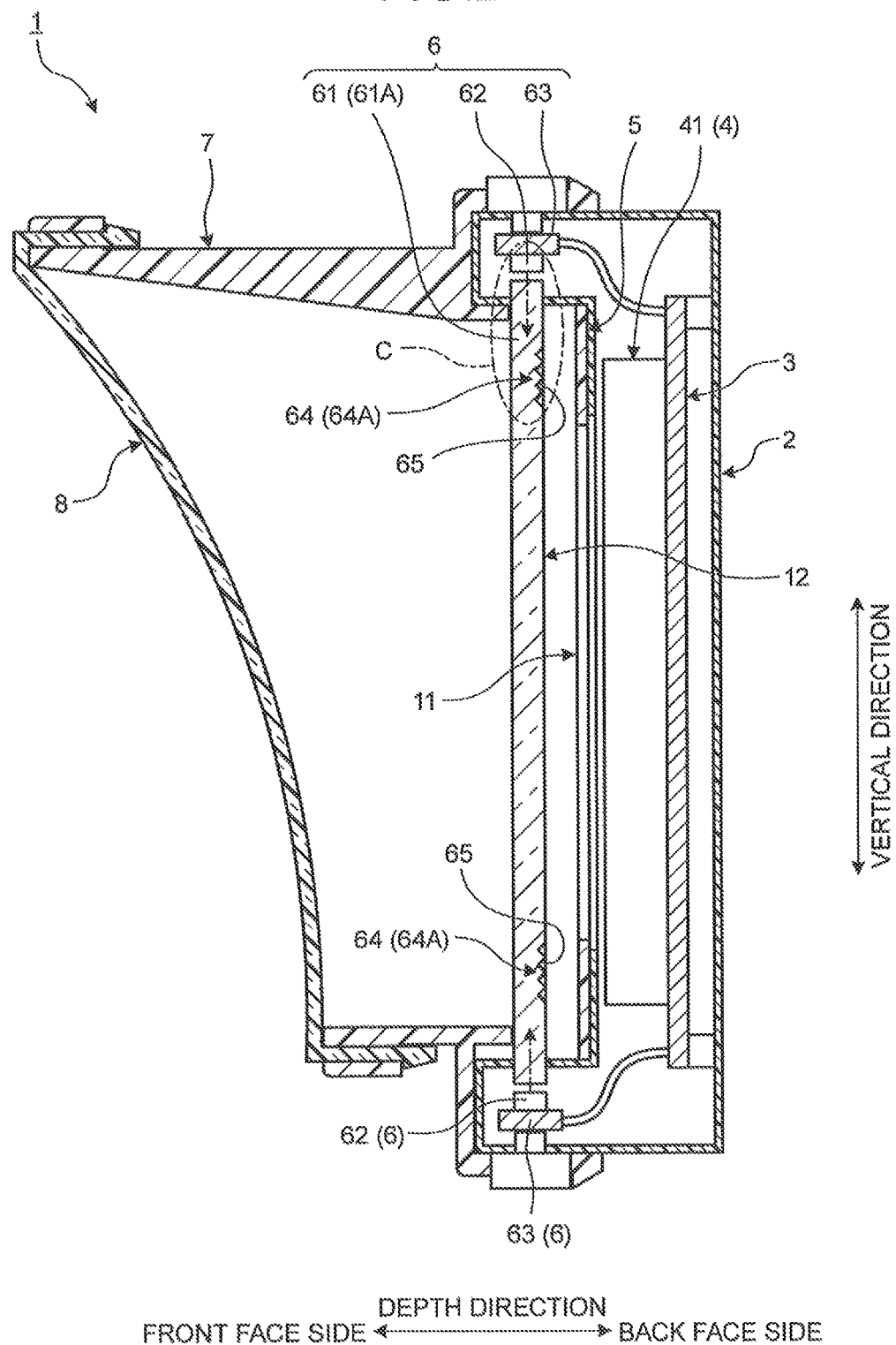
FIG. 2 is a cross-sectional view taken along line A-A of FIG. 1.
Figure 3:
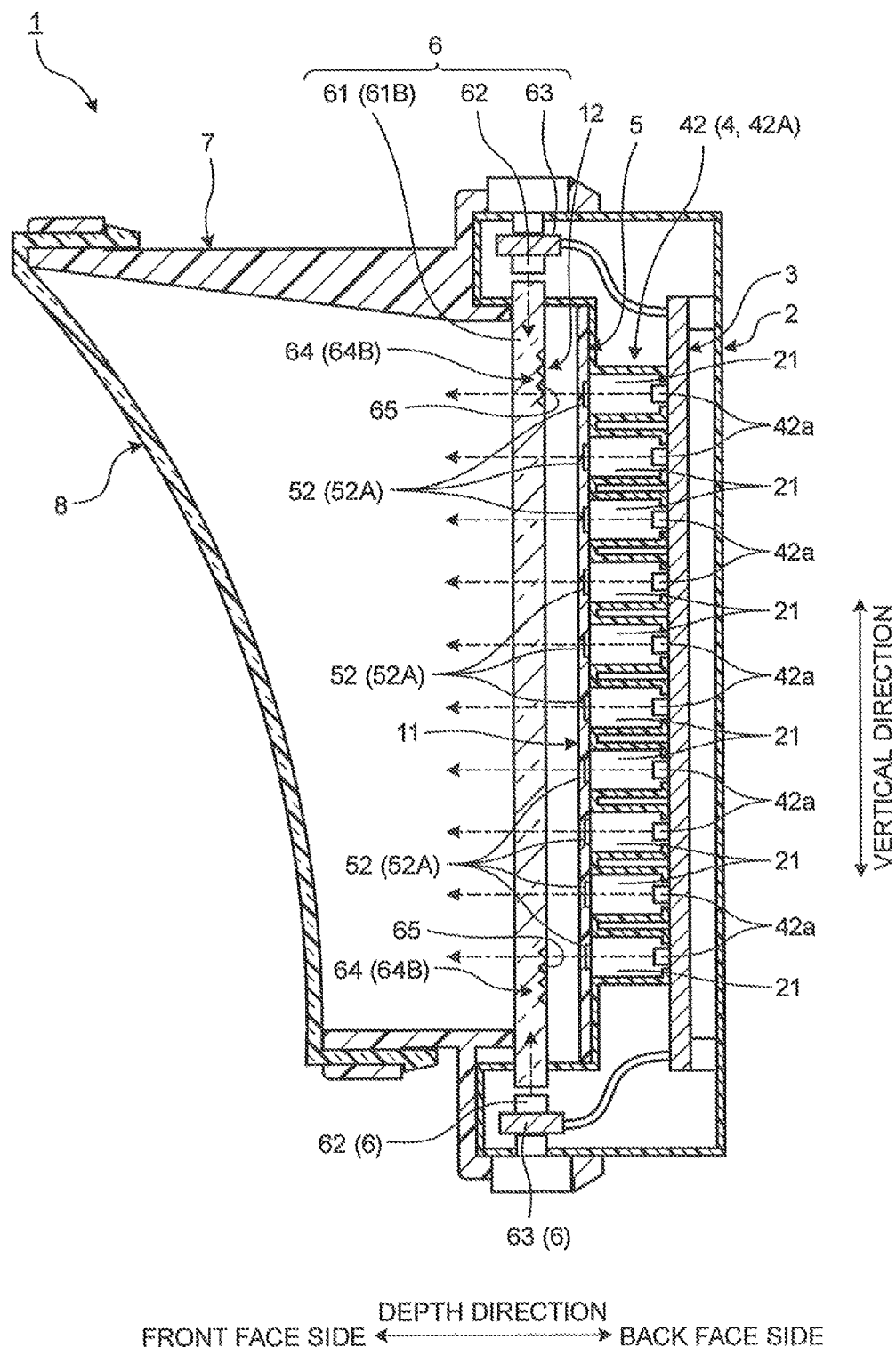
FIG. 3 is a cross-sectional view taken along line B-B of FIG. 1.
Figure 4:
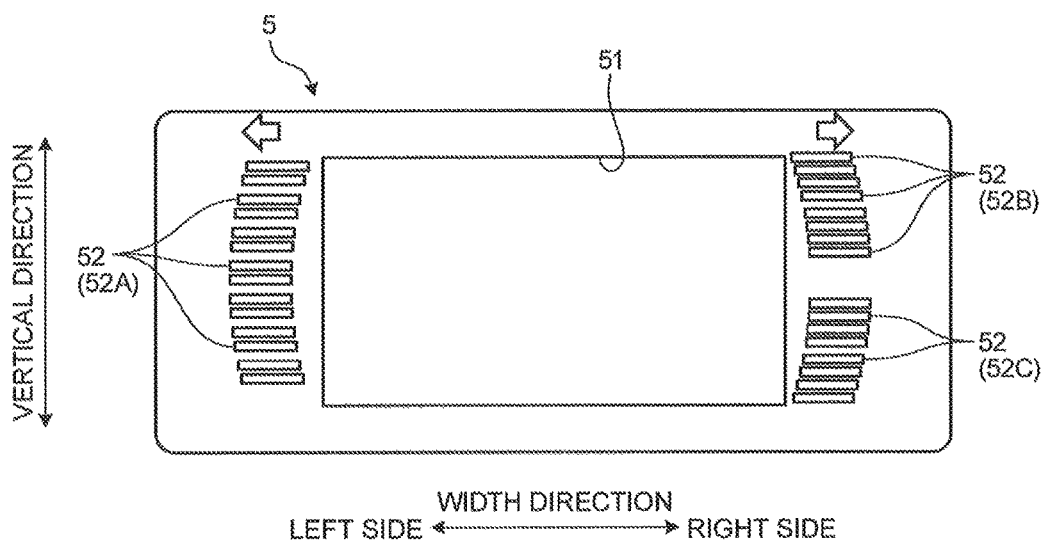
FIG. 4 is a front view illustrating a dial plate of the display device according to the embodiment.
Figure 5:
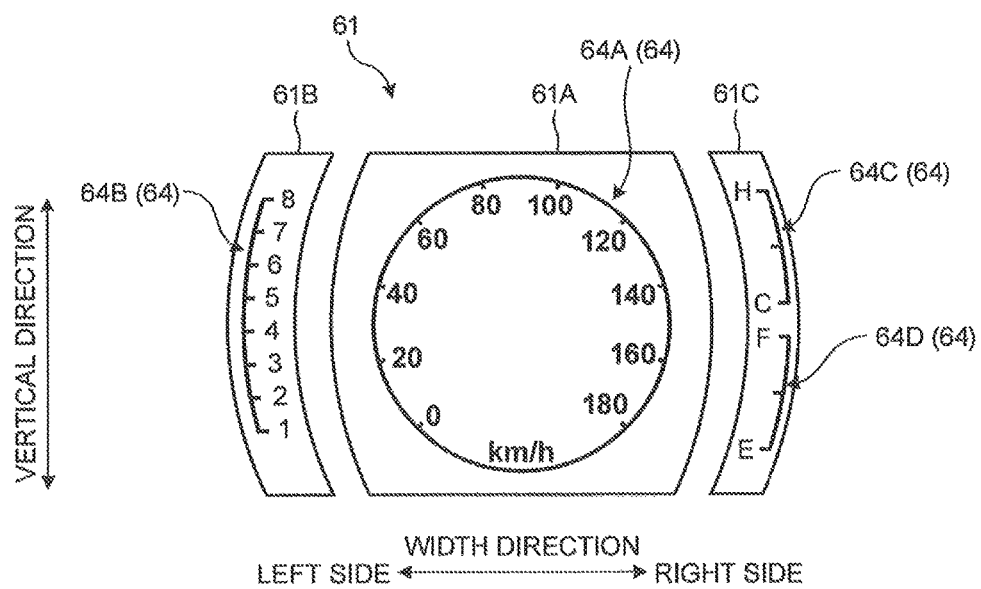
FIG. 5 is a front view illustrating a transparent dial plate of the display device according to the embodiment.
Figure 6:
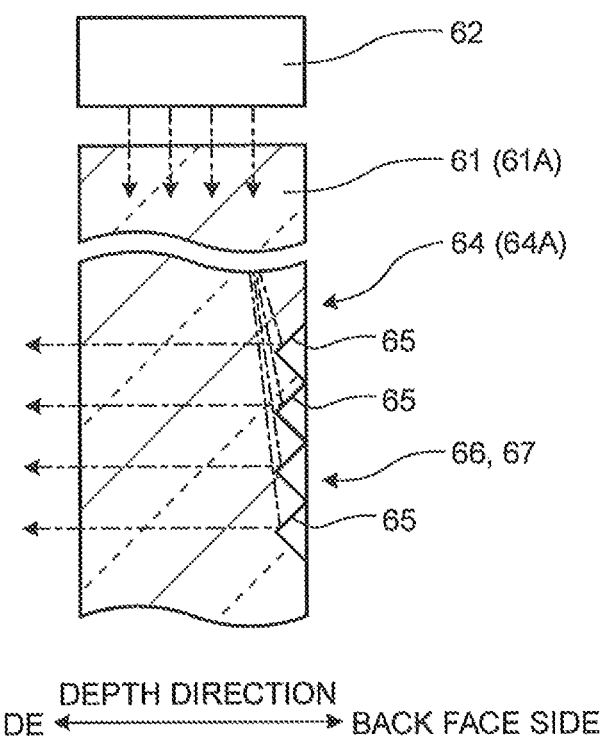
FIG. 6 is a partial cross-sectional view of an area enclosed by an encircling line C of FIG. 2.
Figure 7:
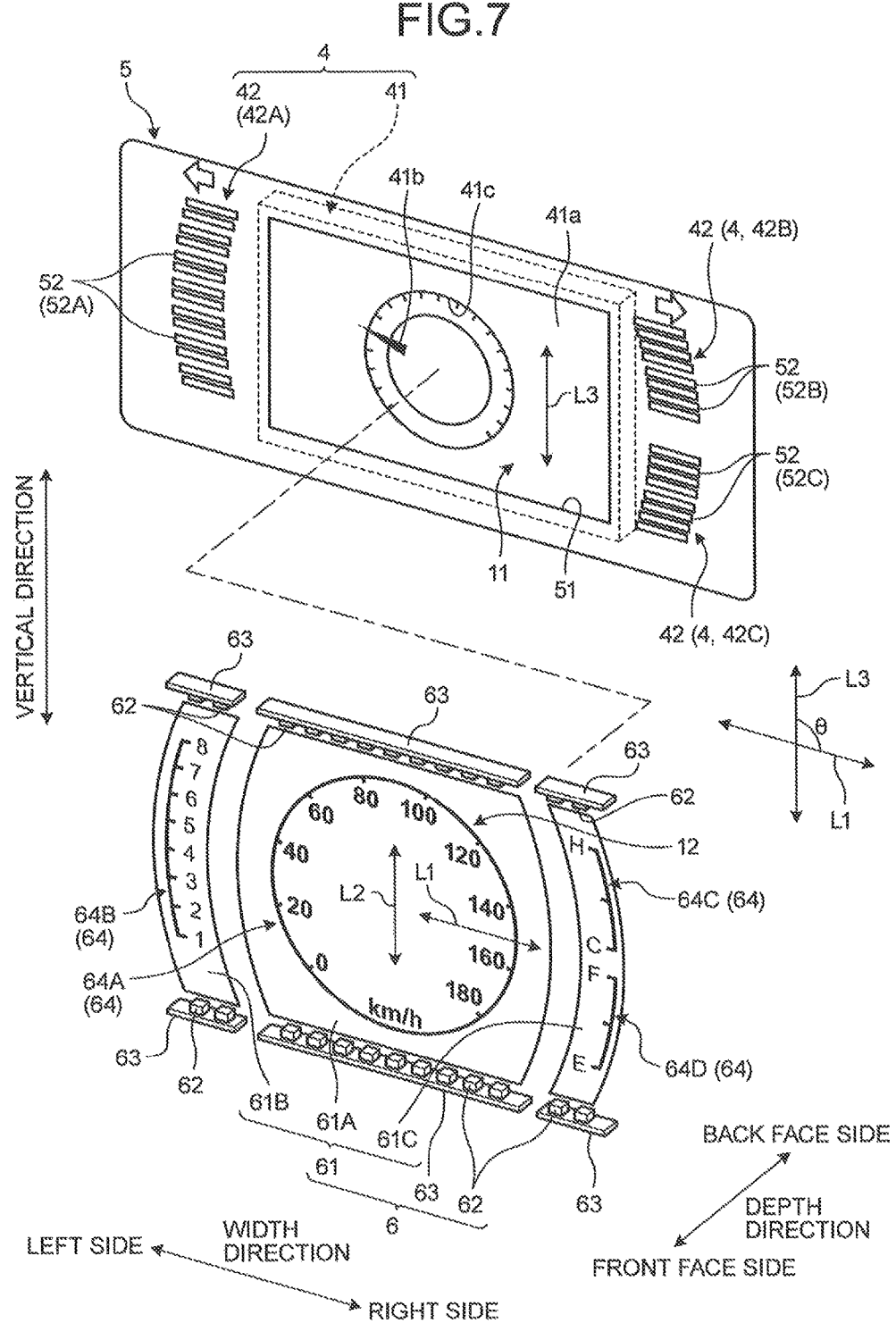
FIG. 7 is an exploded perspective view of a principal part including a first display surface and a second display surface of the display device according to the embodiment.
Figure 8:
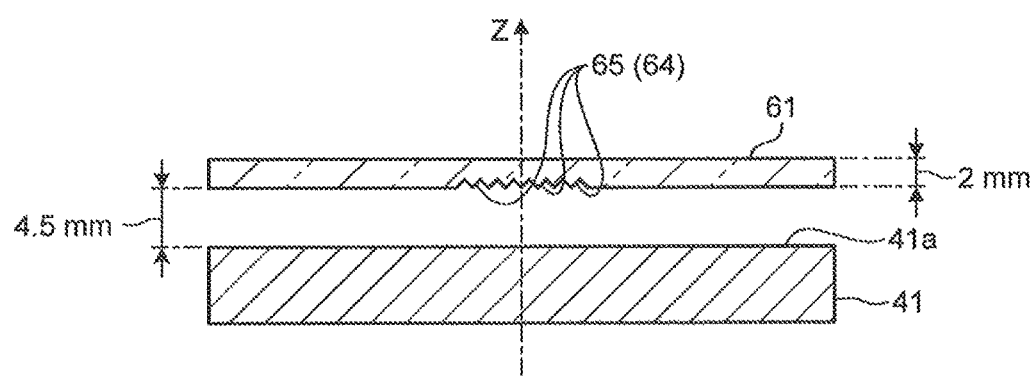
FIG. 8 is a schematic view illustrating a precondition for a brightness measurement test of the display device according to the embodiment.
Figure 9:
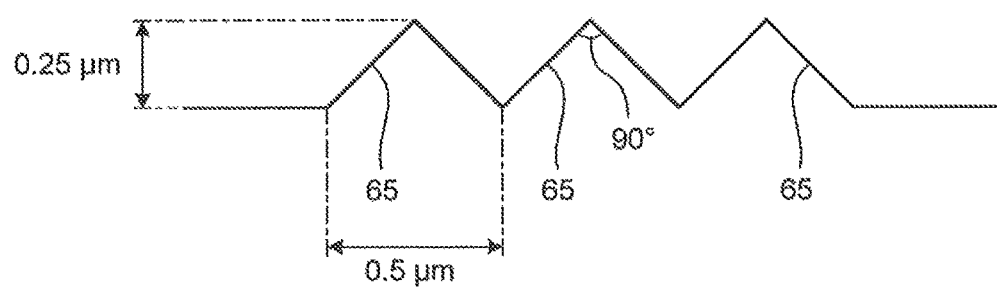
FIG. 9 is a schematic view illustrating the precondition for the brightness measurement test of the display device according to the embodiment.
Figure 10:
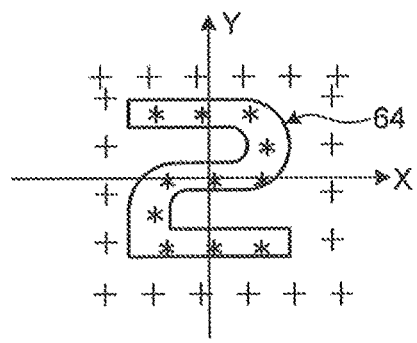
FIG. 10 is a schematic view illustrating the precondition for the brightness measurement test of the display device according to the embodiment.
Figure 11:
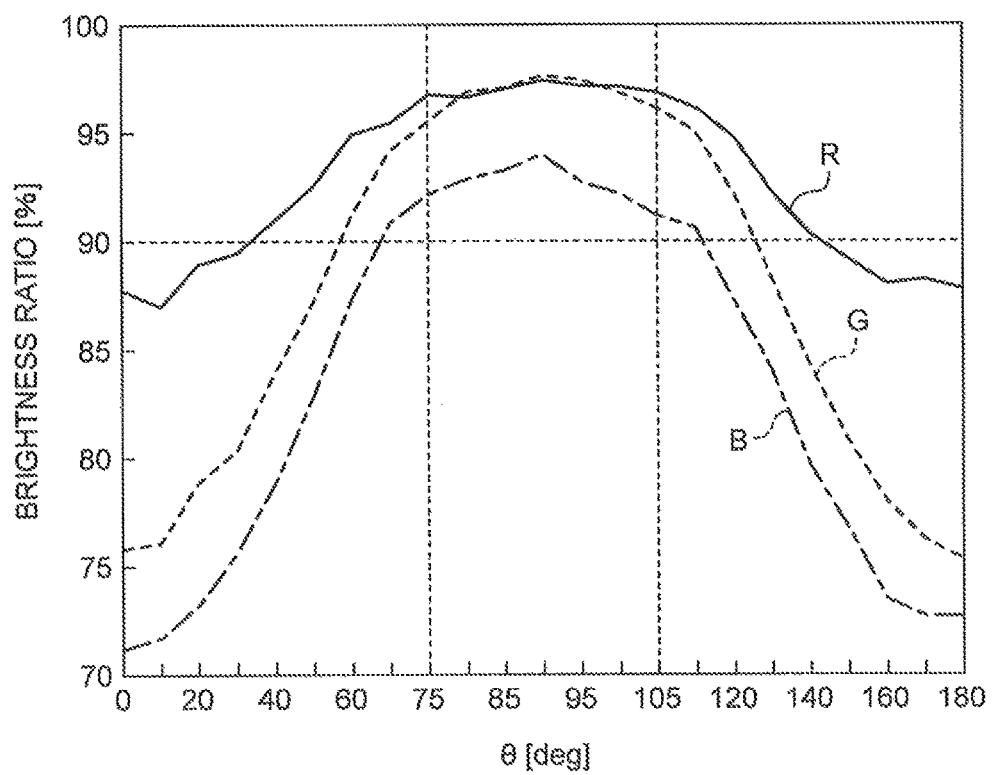
FIG. 11 is a diagram illustrating a result of the brightness measurement test of the display device according to the embodiment.
Figure 12:
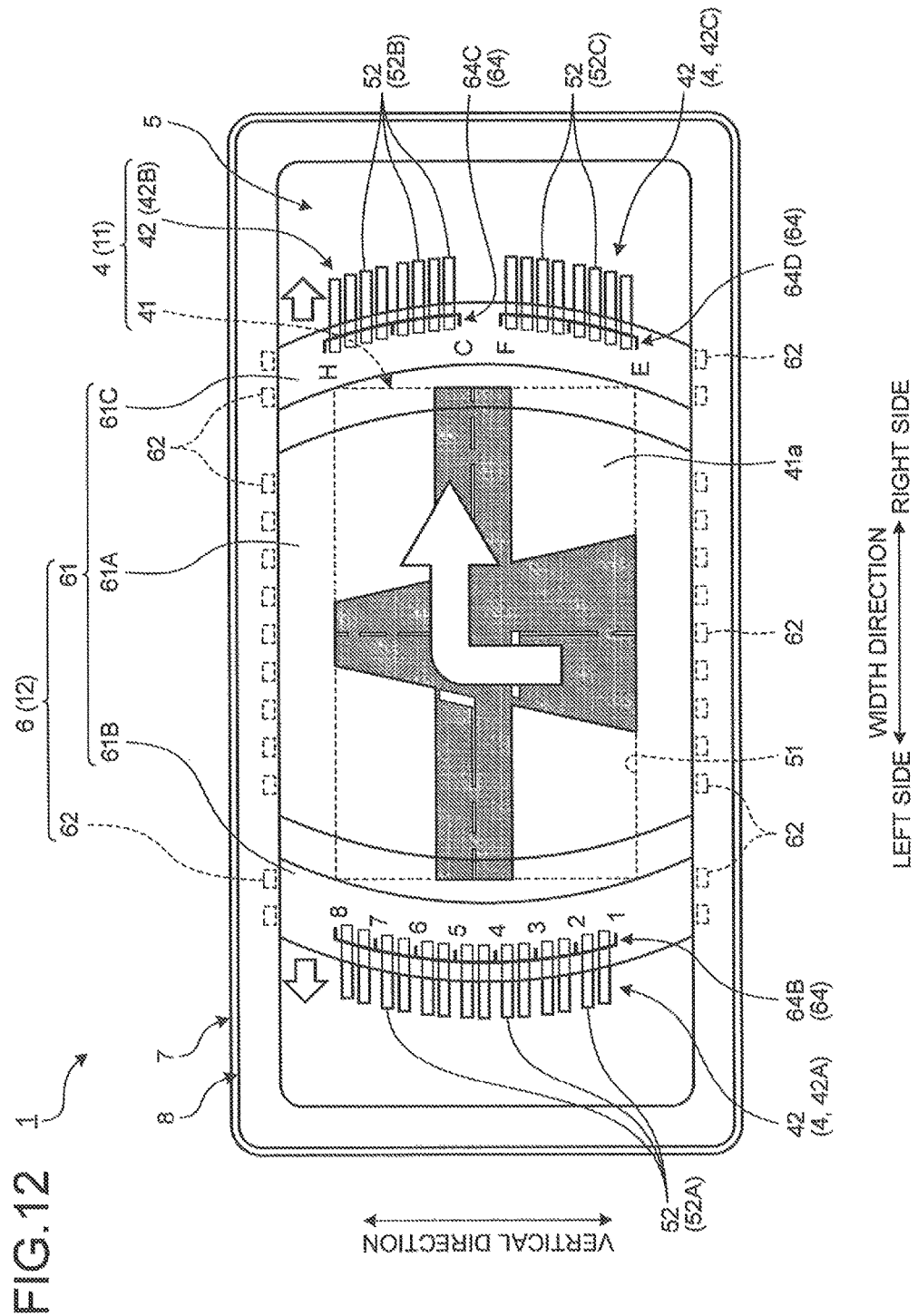
FIG. 12 is a front view illustrating an example of a display mode of the display device according to the embodiment when a part of the second display surface is in a hidden state.

FIG. 1 is a front view of a front face side of a display device in a depth direction according to an embodiment. FIG. 2 is a cross-sectional view taken along line A-A of FIG. 1. FIG. 3 is a cross-sectional view taken along line B-B of FIG. 1. FIG. 4 is a front view illustrating a dial plate of the display device according to the embodiment. FIG. 5 is a front view illustrating a transparent dial plate of the display device according to the embodiment. FIG. 6 is a partial cross-sectional view of an area enclosed by an encircling line C of FIG. 2. FIG. 7 is an exploded perspective view of a principal part including a first display surface and a second display surface of the display device according to the embodiment. FIGS. 8, 9, and 10 are schematic views each illustrating a precondition for a brightness measurement test of the display device. FIG. 11 is a diagram illustrating a result of the brightness measurement test of the display device. FIG. 12 is a front view illustrating an example of a display mode of the display device according to the embodiment when a part of the second display surface is in a hidden state. FIG. 13 is a cross-sectional view of a display device according to a variation.

A display device 1 of the present embodiment illustrated in FIGS. 1, 2, and 3 forms a so-called meter which is mounted to an instrument panel provided to a dashboard of a vehicle such as an automobile and displays various pieces of information used in driving the vehicle, for example.

Note that the width direction of the display device 1 illustrated in FIG. 1 and the like typically corresponds to a vehicle width direction of a vehicle to which the display device 1 is applied. Concerning the width direction of the display device 1 in the following description, a left side and a right side of the display device 1 as seen from the front face thereof will be referred to as a left side in the width direction and a right side in the width direction, respectively. A depth direction of the display device 1 illustrated in FIGS. 2, 3 and the like typically corresponds to a front-back direction (or a vehicle traveling direction) of the vehicle to which the display device 1 is applied. The front face side of the display device 1 corresponds to a side facing a driver's seat of the vehicle, typically a side visually recognized by a driver in the driver's seat. On the other hand, a back face side of the display device 1 corresponds to a side opposite to the front face side in the depth direction, typically a side accommodated in the instrument panel. Moreover, each direction used in the following description indicates a direction in a state in which the display device 1 is installed to the instrument panel, unless otherwise specified.

Specifically, the display device 1 includes a case 2, a circuit board 3, a back face side display device 4, a dial plate 5, a front face side display device 6, a facing plate 7 and a surface glass 8. The display device 1 has a structure in which the case 2, the circuit board 3, the back face side display device 4, the dial plate 5, the front face side display device 6, the facing plate 7, and the surface glass 8 are stacked in this order from the back face side to the front face side in the depth direction. The display device 1 of the present embodiment forms a two-layer display device by superposing the back face side display device 4 and the front face side display device 6 in the depth direction.

The case 2 is made from a resin material or the like and forms a part of a housing that accommodates various components forming the display device 1, the various components being installed to the case.

Various electronic components and wirings provided to realize various functions of the display device 1 are implemented on the circuit board 3. The circuit board 3 is mounted to the case 2 through a fixing member such as a screw.

The back face side display device 4 of the two-layer display device 1 is a display unit located on the back face side in the depth direction and forms a first layer of a display surface (a first display surface 11 to be described later) displaying vehicle information. The back face side display device 4 of the present embodiment is formed of a display 41 as an image display device and a segment display unit 42. The vehicle information displayed by the back face side display device 4 may for example include information on speed and eco-driving of the vehicle as well as various driving information associated with driving that changes moment by moment when driving the vehicle, the various pieces of information including a cumulative distance traveled, coolant temperature, output speed of a power source for traveling, an amount of fuel remaining, a charged amount of a battery, navigation information, map information, and intersection information.

The display 41 is driven and controlled through the circuit board 3 or the like and displays an image associated with the various pieces of vehicle information on an image display surface 41a. The image display surface 41a forms a substantially rectangular display area in the display 41. The display 41 can be formed of a thin liquid crystal display, for example, but can also be formed of a plasma display, an organic EL display, or the like. While the display 41 forms a part of a speedometer displaying the vehicle speed in this case, it is not limited to such case. When functioning as the speedometer, the display 41 displays on the image display surface 41a a real image of a pointer needle (hereinafter simply referred to as an "pointer needle image" in some cases) 41b and a real image forming a scale of the speedometer (hereinafter simply referred to as a "speedometer minor scale image" in some cases) 41c as the vehicle information, for example. The pointer needle image 41b is a needle-like image pointing at a current measured value (the speed in this case) and is an image of a turning pointer needle that turns about a predetermined center of rotation. The speedometer minor scale image 41c is an image of an indication part provided around the pointer needle image 41b to be pointed at thereby, and is an image including a ring with the center corresponding to the center of rotation of the pointer needle image 41b and a scale provided at regular intervals along a circumferential direction on the inner side of the ring. The scale of the speedometer minor scale image 41c is displayed along a turning path of a tip of the pointer needle image 41b.

The segment display unit 42 is driven and controlled through the circuit board 3 or the like, and displays the various pieces of vehicle information by turning on and off a plurality of light sources 42a. The segment display unit 42 is formed of the plurality of light sources 42a provided side by side at regular intervals along a vertical direction and a segment bar 52 drawn on the dial plate 5 to be described, and is an indicator light-type display unit which switchably displays and hides each segment bar 52 according to turning on/off of each light source 42a. Each light source 42a is formed of an LED (Light Emitting Diode) element, for example, but it is not limited to such example. Each light source 42a is housed one by one in each of a plurality of lamp housings 21 formed in the case 2, and is implemented on the circuit board 3 to be driven and controlled. Each light source 42a radiates light from the back face side toward the front face side in the depth direction. Here, the segment display unit 42 includes a tachometer segment display unit 42A forming a part of a tachometer displaying the engine speed of the vehicle, a water temperature gauge segment display unit 42B forming a part of a water temperature gauge displaying the coolant temperature of the vehicle, and a fuel gauge segment display unit 42C forming a part of a fuel gauge displaying the amount of fuel remaining of the vehicle. The tachometer segment display unit 42A is provided on the left side of the display 41 in the width direction from an upper end to a lower end of the case 2 in the vertical direction. The water temperature gauge segment display unit 42B is provided on the right side of the display 41 in the width direction from the upper end to the middle of the case 2 in the vertical direction. The fuel gauge segment display unit 42C is provided on the right side of the display 41 in the width direction below the water temperature gauge segment display unit 42B in the vertical direction from the middle to a lower end of the case 2 in the vertical direction. Note that the segment display unit will be simply referred to as the segment display unit 42 in the following description when the tachometer segment display unit 42A, the water temperature gauge segment display unit 42B and the fuel gauge segment display unit 42C need not particularly be distinguished from one another.

The dial plate 5 is a plate-like member on which various drawing patterns, symbols and character strings corresponding to the vehicle information to be displayed are drawn, as illustrated in FIG. 4. The dial plate 5 is made of a transparent polycarbonate sheet, for example, on which outlined shapes corresponding to the drawing patterns, symbols and character strings are printed with dark-colored ink to draw the drawing patterns, symbols and character strings. Here, a substantially rectangular opening 51 is formed roughly in the center of the dial plate 5. A surface on the front face side of the display 41 is exposed on the front face side of the dial plate 5 through the opening 51, where this surface on the front face side of the display 41 forms a display area of the substantially rectangular image display surface 41a. Moreover, the dial plate 5 includes at least a plurality of the segment bars 52 as the drawing patterns, symbols and character strings related to the vehicle information. These segment bars 52 on the dial plate 5 correspond to the aforementioned outlined parts, or parts transmitting light. Each segment bar 52 is formed to have a rectangular bar shape along the width direction. Each segment bar 52 forms a part of the segment display unit 42. The plurality of segment bars 52 includes a tachometer segment bar 52A formed for each light source 42a of the tachometer segment display unit 42A, a water temperature gauge segment bar 52B formed for each light source 42a of the water temperature gauge segment display unit 42B, and a fuel gauge segment bar 52C formed for each light source 42a of the fuel gauge segment display unit 42C. The tachometer segment bar 52A is provided side by side at regular intervals along the vertical direction on the left side of the opening 51 in the width direction, whereas each of the water temperature gauge segment bar 52B and the fuel gauge segment bar 52C is provided side by side at regular intervals along the vertical direction on the right side of the opening 51 in the width direction. Here, each of the tachometer segment bar 52A, the water temperature gauge segment bar 52B and the fuel gauge segment bar 52C is arrayed while slightly curved. Note that the segment bar will be simply referred to as the segment bar 52 in the following description when the tachometer segment bar 52A, the water temperature gauge segment bar 52B and the fuel gauge segment bar 52C need not particularly be distinguished from one another.

Light is radiated from the back face side of the dial plate 5 in the depth direction when each light source 42a of the segment display unit 42 is individually turned on, so that the light radiated to a part corresponding to each segment bar 52 is transmitted to turn on each segment bar 52 individually. On the other hand, each segment bar 52 is turned off individually when each light source 42a of the segment display unit 42 is turned off individually.

Referring back to FIGS. 1 to 3, the front face side display device 6 of the two-layer display device 1 is a display unit located on the front face side in the depth direction and forms a second layer of a display surface (a second display surface 12 to be described) displaying a predetermined drawing pattern. The front face side display device 6 includes a transparent dial plate 61, a light source 62 and a circuit board 63.

The transparent dial plate 61 is disposed facing the front face side of the back face side display device 4, and moreover on the front face side of the dial plate 5. The transparent dial plate 61 is a transparent light-guiding plate formed of a transparent member (transparent medium) having transparency of transmitting the light radiated from the display 41. As illustrated in FIGS. 1 and 5, the transparent dial plate 61 includes a main transparent dial plate 61A and a pair of sub-transparent dial plates 61B and 61C provided on both sides of the main transparent dial plate 61A in the width direction. The main transparent dial plate 61A is provided such that at least a part thereof is disposed facing the front face side of the display 41 of the back face side display device 4. Here, the main transparent dial plate 61A is formed into a barrel shape in which both end faces of the dial plate in the vertical direction are straight-lined along the width direction while both end faces in the width direction protrude outward and are curved. The sub-transparent dial plate 61B is provided such that at least a part thereof is disposed facing the front face side of the tachometer segment display unit 42A of the back face side display device 4. Here, the sub-transparent dial plate 61B is formed into a shape in which both end faces of the dial plate in the vertical direction are straight-lined along the width direction while both end faces in the width direction are curved along the curve of the left end face of the main transparent dial plate 61A in the width direction. The sub-transparent dial plate 61C is provided such that at least a part thereof is disposed facing the front face side of each of the water temperature gauge segment display unit 42B and the fuel gauge segment display unit 42C of the back face side display device 4. Here, the sub-transparent dial plate 61C is formed into a shape in which both end faces of the dial plate in the vertical direction are straight-lined along the width direction while both end faces in the width direction are curved along the curve of the right end face of the main transparent dial plate 61A in the width direction. Note that the transparent dial plate will be simply referred to as the transparent dial plate 61 in the following description when the main transparent dial plate 61A and the sub-transparent dial plates 61B and 61C need not particularly be distinguished from one another.

As illustrated in FIGS. 1, 2, 3, 5, 6 and the like, a plurality of fine grooves 65 as indentation parts forming a drawing pattern (display design) 64 is formed on the transparent dial plate 61. The groove 65 forming the drawing pattern 64 may be formed to have a recess on a main surface of the transparent dial plate 61, in this case a main surface on the back face side of the transparent dial plate 61, by engraving employing various methods such as laser processing, for example. Alternatively, the groove 65 forming the drawing pattern 64 may be formed to have a recess on the main surface of the transparent dial plate 61, in this case the main surface on the back face side of the transparent dial plate 61, by resin-molding the transparent dial plate 61 while using a die provided with a projected shape corresponding to the groove 65, for example. The plurality of fine grooves 65 is formed along the width direction in this example. That is, an extension direction L1 of the grooves 65 is parallel to the width direction. The extension direction L1 of the grooves 65 will be described in detail later on. The drawing pattern 64 formed of the grooves 65 on the transparent dial plate 61 may include various drawing patterns associated with driving information displayed on the display 41, for example.

Here, a real-image drawing pattern 64A forming a scale of the speedometer (hereinafter simply referred to as a "speedometer major scale drawing pattern" in some cases) is drawn as the drawing pattern 64 by the fine grooves 65 on the main transparent dial plate 61A of the transparent dial plate 61. The speedometer major scale drawing pattern 64A is a drawing pattern provided around the pointer needle image 41b and serves as an indication part pointed at by the pointer needle image 41b when the display 41 functions as the speedometer. The speedometer major scale drawing pattern 64A includes drawing patterns of a ring with the center corresponding to the center of rotation of the pointer needle image 41b, a scale provided on the inner side of the ring at regular intervals along a circumferential direction, a number representing speed, and a unit [km/h]. The scale of the speedometer major scale drawing pattern 64A is drawn along the turning path of the tip of the pointer needle image 41b. The ring of the speedometer major scale drawing pattern 64A is larger than the ring of the speedometer minor scale image 41c, and at the same time the scale of the speedometer major scale drawing pattern has a wider interval relative to an interval of the scale of the speedometer minor scale image 41c.

A real-image drawing pattern 64B forming a scale of the tachometer (hereinafter simply referred to as a "tachometer scale drawing pattern" in some cases) is drawn as the drawing pattern 64 by the fine grooves 65 on the sub-transparent dial plate 61B of the transparent dial plate 61. The tachometer scale drawing pattern 64B is a drawing pattern that is drawn to be superimposed on the tachometer segment display unit 42A and serves as an indication part indicated by the tachometer segment bar 52A. The tachometer scale drawing pattern 64B includes drawing patterns of an arc-shaped base line extending along the vertical direction, a scale provided on the right side of the base line in the width direction, and a number representing the number of revolutions.

A real-image drawing pattern 64C forming a scale of the water temperature gauge (hereinafter simply referred to as a "water temperature gauge scale drawing pattern" in some cases) and a real-image drawing pattern 64D forming a scale of the fuel gauge (hereinafter simply referred to as a "fuel gauge scale drawing pattern" in some cases) are drawn as the drawing pattern 64 by the fine grooves 65 on the sub-transparent dial plate 61C of the transparent dial plate 61. The water temperature gauge scale drawing pattern 64C is a drawing pattern that is drawn to be superimposed on the water temperature gauge segment display unit 42B and serves as an indication part indicated by the water temperature gauge segment bar 52B. The water temperature gauge scale drawing pattern 64C includes drawing patterns of an arc-shaped base line extending along the vertical direction, a scale provided on the left side of the base line in the width direction, and letters "H" and "C" representing high/low temperatures of the water. The fuel gauge scale drawing pattern 64D is a drawing pattern that is drawn to be superimposed on the fuel gauge segment display unit 42C and serves as an indication part indicated by the fuel gauge segment bar 52C. The fuel gauge scale drawing pattern 64D includes drawing patterns of an arc-shaped base line extending along the vertical direction, a scale provided on the left side of the base line in the width direction, and letters "F" and "E" representing the amount of fuel remaining.

Note that the drawing pattern will be simply referred to as the drawing pattern 64 in the following description when the speedometer major scale drawing pattern 64A, the tachometer scale drawing pattern 64B, the water temperature gauge scale drawing pattern 64C and the fuel gauge scale drawing pattern 64D need not particularly be distinguished from one another.

The light source 62 radiates light onto an end face of the transparent dial plate 61. The light source 62 is formed of an LED (Light Emitting Diode) element, for example, but it is not limited to such example. The light source 62 is provided such that an optical axis direction of the light source is orthogonal to the end face of the transparent dial plate 61 and that the radiated light enters from the end face of the transparent dial plate 61. A plurality of the light sources 62 is provided at positions facing an upper end face and a lower end face of the transparent dial plate 61 in the vertical direction at a predetermined interval along the width direction of the end faces. Here, each light source 62 is arranged such that an optical axis direction of the light source is parallel to the vertical direction, whereby a radiation direction L2 of the light from the light source 62 is parallel to the vertical direction. That is, each light source 62 facing the upper end face of the transparent dial plate 61 in the vertical direction radiates light downward along the vertical direction, whereas each light source 62 facing the lower end face of the transparent dial plate 61 in the vertical direction radiates light upward along the vertical direction. Here, the extension direction L1 of the grooves 65 and the light radiation direction (or the optical axis direction) L2 are orthogonal to each other. Each light source 62 is arranged at the position hidden by the facing plate 7 (to be described) and the like when seen from the front face side, for example.

The circuit board 63 is electrically connected to each light source 62 and the main circuit board 3. Each light source 62 is driven and controlled through the circuit board 3, the circuit board 63 and the like. Each light source 62 is typically adapted such that the light source 62 provided along the end face of the main transparent dial plate 61A, the light source 62 provided along the end face of the sub-transparent dial plate 61B, and the light source 62 provided along the end face of the sub-transparent dial plate 61C can be switchably turned on and off individually.

The drawing pattern 64 on the front face side display device 6 configured as described above is switchably displayed and hidden on the basis of turning on/off of each light source 62 that is driven and controlled through the circuit board 3, the circuit board 63 and the like. The drawing pattern 64 on the front face side display device 6 is illuminated and displayed when the light source 62 is turned on, namely, a driver or the like can visually recognize the drawing pattern 64 when the light radiated from the light source 62 enters the end face of the transparent dial plate 61 and propagates through the transparent dial plate 61 so that at least a part of the incident light is reflected toward the front face side of the grooves 65 forming the drawing pattern 64 (refer to FIG. 6 and the like). In this case, the front face side display device 6 forms a predetermined design by displaying the drawing pattern 64, which is displayed on the transparent dial plate 61 when the driver sees it from the front face side (driver's seat side), on top of the image (the pointer needle image 41b and the speedometer minor scale image 41c) on the image display surface 41a of the display 41 and each segment bar 52 of the segment display unit 42, thereby enabling various displays. On the other hand, the drawing pattern 64 on the front face side display device 6 is hidden when the light source 62 is turned off, whereby the light radiated from the display 41 or the like and transmitted through the transparent dial plate 61 allows the driver or the like to visually recognize various images displayed on the image display surface 41a and the like more easily.

The facing plate 7 is a frame-like member that encloses the dial plate 5, the transparent dial plate 61 and the like and holds the dial plate 5, the transparent dial plate 61 and the like. The facing plate 7 is mounted to the case 2.

The surface glass 8 is a protection member having optical transparency allowing light to be transmitted, and is mounted to the facing plate 7.

Here, as illustrated in FIGS. 1, 2, 3, and 7, the first layer of display surface formed of the back face side display device 4 forms the first display surface 11 displaying the vehicle information. On the other hand, the second layer of display surface formed of the front face side display device 6 forms the second display surface 12 that is disposed facing the first display surface 11 to transmit light, has the drawing pattern 64, and can be switched to a displayed state in which the drawing pattern 64 is displayed and a hidden state in which the drawing pattern 64 is hidden. The first display surface 11 and the second display surface 12 form a plurality of facing display surfaces in the depth direction, or the vehicle traveling direction, where the first display surface 11 forms the display surface on the back side in the vehicle traveling direction among the plurality of display surfaces while the second display surface 12 forms the display surface on the front side in the vehicle traveling direction (a view position side of a viewer such as the driver) among the plurality of display surfaces.

More specifically, the first display surface 11 is formed of a surface on which the image display surface 41a of the display 41 exposed at the opening 51 of the dial plate 5 and each segment bar 52 on the dial plate 5 are formed. That is, the first display surface 11 includes a display area of the image display surface 41a having the substantially rectangular shape and a display area having the shape of a rectangular bar formed of each segment bar 52.

On the other hand, the second display surface 12 is formed of the main surface on the back face side of the transparent dial plate 61 on which the grooves 65 forming the drawing pattern 64 are formed. The second display surface 12 can be switched to the displayed state and the hidden state according to turning on/off of each light source 62 regardless of the state of the first display surface 11. The displayed state of the second display surface 12 refers to a state in which the drawing pattern 64 is displayed by the light radiated from the light source 62. On the other hand, the hidden state of the second display surface 12 refers to a state in which the drawing pattern 64 is hidden by the turning off of the light source 62.

The display device 1 of the present embodiment is adapted to be able to realize the visual effect that makes the display area look relatively large by drawing the drawing pattern 64 such that at least a part thereof spans across the display area and outside the display area thereof of the first display surface 11 when seen along a stacking direction of the first display surface 11 and the second display surface 12. The stacking direction of the first display surface 11 and the second display surface 12 typically corresponds to the depth direction, where the drawing pattern 64 is formed across the display area and outside the display area thereof of the first display surface 11 when seen from the front face side along the depth direction. That is, the drawing pattern 64 is drawn across and to be superimposed on a boundary of the display area and the hidden area of the first display surface 11. Furthermore, the drawing pattern 64 drawn across the display area and outside the display area thereof of the first display surface 11 is one in which at least a part of the drawing pattern 64 has a continuous line intersecting a boundary line of the display area and the hidden area of the first display surface 11 on the boundary line.

The speedometer major scale drawing pattern 64A of the drawing pattern 64 is drawn on the front face side of the image display surface 41a forming the first display surface 11, and drawn across the display area and outside the display area of the image display surface 41a. The speedometer major scale drawing pattern 64A includes an arc portion 64a (refer to FIG. 1) jutting out the rectangular display area of the first display surface 11, in this case jutting from the display area of the image display surface 41a having the substantially rectangular shape to the outside of the display area. Here, the speedometer major scale drawing pattern 64A is drawn such that a part of the ring formed into a perfect circle lies off the display area of the image display surface 41a on the upper and lower sides thereof in the vertical direction to form the arc portion 64a jutting out from the display area to the outside of the display area, whereby the drawing pattern is drawn across the display area and outside the display area. Each of the tachometer scale drawing pattern 64B, the water temperature gauge scale drawing pattern 64C, and the fuel gauge scale drawing pattern 64D of the drawing pattern 64 is drawn on the front face side of each segment bar 52 forming the first display surface 11 across a display area and outside the display area of each segment bar 52. Each of the tachometer scale drawing pattern 64B, the water temperature gauge scale drawing pattern 64C, and the fuel gauge scale drawing pattern 64D is drawn across the display area and outside the display area of each segment bar 52 on each segment display unit 42.

The display device 1 as described above is adapted to form the drawing pattern 64 displayed on the second display surface 12 across the display area and outside the display area of the first display surface 11 to thus be able to display the drawing pattern 64 on the second display surface 12 in an area in which the vehicle information cannot be displayed on the first display surface 11. Therefore, the display device 1 extends the display area on the second display surface 12 outside the display area of the first display surface 11 and creates the visual effect that makes the display area of the display device 1 as a whole look relatively large.

Moreover, as illustrated in FIG. 7, the display device 1 of the present embodiment is configured such that a polarization direction L3 of light radiated from the back face side display device 4 and the extension direction L1 of the grooves 65 forming each drawing pattern 64 cross at a predetermined angle range, whereby adequate visibility can be ensured while realizing various displays by combining the back face side display device 4 and the front face side display device 6. Here, the extension direction L1 of the grooves 65 typically corresponds to a direction in which the grooves 65 extend. The polarization direction L3 of light radiated from the back face side display device 4 corresponds to a polarization direction of light radiated from the first display surface 11.

The display 41 forming the back face side display device 4 of the present embodiment is configured to radiate light polarized in one direction and display an image (such as the pointer needle image 41b and the speedometer minor scale image 41c) related to the vehicle information. That is, the display 41 emits light polarized in one direction by aligning light radiated from a backlight in the polarization direction L3 as a transmission axis direction through a polarizing plate or the like and emitting light in an oscillation direction parallel to the polarization direction L3 (transmission axis direction). The polarization direction L3 of the display 41 typically corresponds to a final transmission axis direction of the display 41. The display 41 is typically configured such that a front face of a final polarizing plate forms the front surface of the image display surface 41a, the transparent dial plate 61 is arranged on the front face side of the polarizing plate, and the light in the oscillation direction parallel to the polarization direction L3 enters the transparent dial plate 61. Here, the polarization direction L3 is parallel to the vertical direction.

Note that while the polarization direction L3 of the display 41 has been described, the light radiated from the segment display unit 42 can also be polarized in the polarization direction L3 by providing a polarizing plate between each light source 42a of the segment display unit 42 and the transparent dial plate 61, the polarizing plate being adapted to polarize light from each light source 42a in one direction, or the polarization direction L3 in this case. Accordingly, the back face side display device 4 can polarize light radiated by the entire device including the display 41 and the segment display unit 42 in the polarization direction L3.

On the other hand, as illustrated in FIG. 6 and the like, the plurality of fine grooves 65 forming the drawing pattern (display design) 64 is preferably formed to have a substantially V-shaped cross section with a pitch equal to 1 μm or smaller (a lower limit value equals a dimension feasible in manufacturing, for example). Each groove 65 is formed as a straight groove extending in one direction. Moreover, the transparent dial plate 61 is configured such that transmittance of material forming the area of the drawing pattern 64 is equivalent to transmittance of material forming an area around the drawing pattern 64 on the transparent dial plate 61. A diffraction grating formed of these fine grooves 65 tends to have different diffraction efficiency between a case where the oscillation direction of the light is perpendicular (orthogonal) to the extension direction L1 of the grooves 65 and a case where the direction is parallel to the extension direction L1. That is, the diffraction grating formed of these fine grooves 65 typically tends to transmit light when the oscillation direction thereof is perpendicular to the extension direction L1 of the grooves 65, and block light when the oscillation direction thereof is parallel to the extension direction L1 of the grooves 65. In other words, the fine grooves 65 formed on the transparent dial plate 61 act similarly to the polarizing plate to thus transmit light oscillating in a transmission axis direction orthogonal to the extension direction L1 of the grooves 65 and block most of light oscillating in an absorption axis direction (the extension direction L1 of the grooves 65) orthogonal to the transmission axis direction.

The display device 1 of the present embodiment is configured such that the polarization direction L3 of the back face side display device 4 and the extension direction L1 of the grooves 65 forming the drawing pattern 64 cross at an angle ranging from 75° or larger and 105° or smaller. Where the angle formed by the polarization direction (transmission axis direction) L3 of the back face side display device 4 and the extension direction L1 of the grooves 65 forming the drawing pattern 64 equals an angle θ (refer to FIG. 7), the grooves 65 are formed on the transparent dial plate 61 such that the angle θ satisfies a conditional expression of [75°≤θ≤105°]. That is, the polarization direction L3 and the extension direction L1 cross at a predetermined angle θ that falls within the range of 75° or larger and 105° or smaller. More preferably, the polarization direction L3 and the extension direction L1 cross at a predetermined angle θ that falls within the range of 85° or larger and 95° or smaller. Most preferably, the polarization direction L3 of the display 41 is orthogonal to the extension direction L1 of the grooves 65 forming the drawing pattern 64. The grooves 65 are formed on the transparent dial plate 61 such that the extension direction L1 of the grooves 65 is orthogonal to the polarization direction L3 of the back face side display device 4 while the transmission axis direction of the diffraction grating formed of the fine grooves 65 is parallel to the polarization direction L3. Note that when the polarization direction L3 of the back face side display device 4 is orthogonal to the extension direction L1 of the grooves 65, the angle formed by the directions equals θ=90°, which at the same time has an allowable error within the range of an allowable error angle α according to manufacturing tolerance of the display device 1, for example.

The aforementioned display device 1 is configured such that the polarization direction L3 of the back face side display device 4 is orthogonal to the extension direction L1 of the grooves 65 (θ=90°) or, in other words, the polarization direction L3 of the back face side display device 4 is parallel to the transmission axis direction of the grooves 65. The display device 1 therefore transmits almost all light from the display 41 in the area inside the drawing pattern 64 as well as the area outside the drawing pattern 64 when the device is in the hidden state in which the light source 62 is turned off. As a result, when the light source 62 is turned off, a brightness ratio representing a ratio of brightness in the area of the drawing pattern 64 to brightness of the area around the drawing pattern 64 on the transparent dial plate 61 (hereinafter simply referred to as a "brightness ratio of the area of the drawing pattern 64 to the area around the drawing pattern 64" in some cases) becomes the largest, whereby the drawing pattern 64 on the display device 1 can be less easily visually recognized as the area of the drawing pattern 64 becomes less conspicuous relative to the area around the drawing pattern 64. The brightness ratio of the area of the drawing pattern 64 to the area around the drawing pattern 64 can be typically expressed by "brightness of the area of the drawing pattern 64/brightness of the area around the drawing pattern 64×100[%]", indicating that a difference in brightness between the area around the drawing pattern 64 and the area of the drawing pattern 64 is increased relatively as the brightness ratio is decreased.

Note that the display device 1 can keep the drawing pattern 64 less easily visually recognized as long as the angle formed by the polarization direction L3 and the extension direction L1 falls within the range of [75°≤θ≤105°], more preferably [85°≤θ≤95°], in addition to the orthogonal state (θ=90°) since the brightness ratio of the area of the drawing pattern 64 to the area around the drawing pattern 64 falls within a predetermined brightness ratio range. Here, the predetermined brightness ratio range corresponds to a range of 90% or higher and 100% or lower, more preferably 92.5% or higher and 100% or lower, for example. The display device 1 configured such that the polarization direction L3 of the back face side display device 4 and the extension direction L1 of the grooves 65 cross at the aforementioned angle range as described above can be configured such that the polarization direction L3 and the extension direction L1 cross at the angle range where the brightness ratio of the brightness of the area of the drawing pattern 64 to the brightness of the area around the drawing pattern 64 equals 90% or higher and 100% or lower.

Now, a brightness measurement test pertaining to the display device 1 will be described with reference to FIGS. 8 to 11. The brightness measurement test performed here uses the display device 1 according to the aforementioned embodiment to actually measure brightness of the transparent dial plate 61 with use of a brightness measurement camera. Here, the display device 1 is configured such that the display 41, the transparent dial plate 61 and the like are arranged as illustrated in FIG. 8 while the grooves 65 are formed to have the shape as illustrated in FIG. 9. That is, the display device 1 is configured such that the thickness of the transparent dial plate 61 in the depth direction is 2 mm and the space in the depth direction between the image display surface (front face) 41a of the display 41 and the back face of the transparent dial plate 61 is 4.5 mm. The display device 1 is also configured such that the grooves 65 forming the drawing pattern 64 are formed on the back face of the transparent dial plate 61. A brightness measurement position in a Z direction (depth direction) in the present brightness measurement test is on the face on which the grooves 65 of the transparent dial plate 61 are formed, and corresponds to a focal position of the brightness measurement camera. In the display device 1, each groove 65 is formed to have a substantially V-shaped cross section with a pitch of 0.5 μm, the depth in the depth direction equal to 0.25 μm, and the angle formed by the base equal to approximately 90° (degrees). Moreover, in the display device 1, each groove 65 is formed as a straight groove extending in one direction. Brightness measurement positions in an X direction (width direction) and a Y direction (vertical direction) in the present brightness measurement test are determined by selecting a plurality of positions in each of the area of the drawing pattern 64 and the area around the drawing pattern 64 as illustrated in FIG. 10 and using a mean value of these positions. Moreover, the brightness measurement test is performed by using red light with X=0.63 and Y=0.35, green light with X=0.31 and Y=0.58, and blue light with X=0.14 and Y=0.05 in a chromaticity diagram as a turn-on condition of a light source color of the display 41. In the present brightness measurement test, the brightness is measured by using the brightness measurement camera at the aforementioned brightness measurement position while rotating the transparent dial plate 61 relatively to the image display surface 41a and changing the angle θ formed by the polarization direction L3 and the extension direction L1 in a state the light source 62 is turned off.

FIG. 11 illustrates a result of the brightness measurement test. FIG. 11 has a horizontal axis representing the angle θ [deg] formed by the polarization direction L3 and the extension direction L1 and a vertical axis representing the brightness ratio [%] of the brightness of the area of the drawing pattern 64 to the brightness of the area around the drawing pattern 64. As it is apparent in FIG. 11, the brightness ratio of the brightness in the area of the drawing pattern 64 to the area around the drawing pattern 64 is 90% or higher and 100% or lower in all red (refer to line R), green (refer to line G) and blue (refer to line B) when the angle θ formed by the polarization direction L3 and the extension direction L1 falls within the range of [75°≤θ≤105°], whereby it is clear that the display device 1 can make the grooves 65 forming the drawing pattern 64 on the transparent dial plate 61 less easily visually recognized when the drawing pattern 64 is hidden. Moreover, the brightness ratio of the brightness in the area of the drawing pattern 64 to the area around the drawing pattern 64 is 92.5% or higher and 100% or lower in all red, green and blue when the angle θ falls within the range of [85°≤θ≤95°], whereby it is clear that the display device 1 can make the grooves 65 even less easily visually recognized. The brightness ratio of the brightness in the area of the drawing pattern 64 to the area around the drawing pattern 64 is the maximum in all red, green and blue when the angle θ equals [θ=90°], namely when the polarization direction L3 is orthogonal to the extension direction L1, whereby it is clear that the display device 1 can make the grooves 65 the least easily visually recognized. In this case, when the angle θ equals [θ=90°], the display device 1 has the brightness ratio of 97.4% with radiation of red light, 97.6% with radiation of green light, and 94% with radiation of blue light.

The display device 1 of the present embodiment is configured such that the extension direction L1 of the grooves 65 is orthogonal to the radiation direction L2 of light from the light source 62 of the front face side display device 6, as described above. In other words, the polarization direction L3 of the back face side display device 4 and the radiation direction L2 of light from the light source 62 are parallel to the vertical direction, whereas the extension direction L1 of the grooves 65 is parallel to the horizontal direction. The display device 1 can thus make the light from the light source 62 incident on the grooves 65 forming the drawing pattern 64 almost perpendicularly thereto so that, when displaying the drawing pattern 64 on the transparent dial plate 61, the amount of light reflected by the grooves 65 toward the front face side (driver's seat side) can be relatively increased to be able to display the drawing pattern 64 clearly.

The second display surface 12 of the present embodiment includes a display structure 66 (refer to FIG. 6) and a non-display structure 67 (refer to FIG. 6) of the drawing pattern 64 by forming the plurality of fine grooves 65 on the main surface on the back face side of the transparent dial plate 61 such that the extension direction L1, the radiation direction L2 and the polarization direction L3 are in the aforementioned positional relationship.

The display structure 66 on the second display surface 12 refers to a structure that forms the drawing pattern 64 by the light radiated from the light source 62 when the second display surface 12 is in the displayed state. Here, when the second display surface 12 is in the displayed state, the display structure 66 forms the drawing pattern 64 by reflecting the light radiated from the light source 62 off of the plurality of fine grooves 65 formed on the surface of the transparent dial plate 61 that is a member forming the second display surface 12. The display structure 66 can thus make the drawing pattern 64 on the second display surface 12 visually recognized by the driver or the like.

On the other hand, the non-display structure 67 on the second display surface 12 refers to a structure that makes the drawing pattern 64 less easily visually recognized, when the second display surface 12 is in the hidden state, compared to when in the displayed state. More specifically, the non-display structure 67 on the second display surface 12 refers to a structure that makes the plurality of fine grooves 65 less easily visually recognized, when the second display surface 12 is in the hidden state, compared to when in the displayed state. Here, the non-display structure 67 is a structure that makes the drawing pattern 64 less easily visually recognized by turning off of the light source 62 and makes the grooves 65 itself less easily visually recognized by forming the grooves 65 such that the polarization direction L3 of the back face side display device 4 and the extension direction L1 of the grooves 65 forming the drawing pattern 64 cross at a predetermined angle range, typically at 75° or larger and 105° or smaller as described above. As a result, the non-display structure 67 allows the area of the drawing pattern 64 and the area around the drawing pattern 64 on the second display surface 12 to have substantially equal amplitudes of transmitted light and to have substantially no difference in brightness, whereby the drawing pattern 64 and the plurality of fine grooves 65 forming the drawing pattern 64 can be less easily visually recognized in the hidden state.

The display device 1 configured as described above displays information with the first display surface 11 and the second display surface 12. More specifically, the first display surface 11 and the second display surface 12 display at least a piece of information in which the vehicle information displayed on the first display surface 11 and the drawing pattern 64 drawn on the second display surface 12 are coordinated. The information in which the vehicle information and the drawing pattern 64 are coordinated is typically a piece of information that is meaningless as information by either the vehicle information on the first display surface 11 or the drawing pattern 64 on the second display surface 12 alone but has meaning only after the vehicle information and the drawing pattern 64 are combined and coordinated with each other. That is, the vehicle information and the drawing pattern 64 each by itself is meaningless but have meaning as information only after combined and coordinated with each other, whereby both are necessary to generate the coordinated information that has meaning.

Specifically, the display device 1 is in a display mode as illustrated in FIG. 1, for example, when each light source 62 of the front face side display device 6 is turned on, namely the entire second display surface 12 is in the displayed state.

The display device 1 in this case displays the speedometer formed of the display 41 and the main transparent dial plate 61A of the front face side display device 6. That is, on the display device 1, images (the pointer needle image 41b and the speedometer minor scale image 41c in this case) related to the vehicle information displayed on the display 41 (first display surface 11) and the speedometer major scale drawing pattern 64A drawn and displayed on the main transparent dial plate 61A (second display surface 12) are combined and coordinated with each other to display vehicle speed of the vehicle. The display device 1 displays a moving image of the pointer needle image 41b turning dynamically on the first display surface 11, and displays current vehicle speed by the pointer needle image 41b pointing at the current speed in the speedometer minor scale image 41c and the speedometer major scale drawing pattern 64A.

Moreover, the display device 1 displays the tachometer formed of the tachometer segment display unit 42A and the sub-transparent dial plate 61B of the front face side display device 6. That is, on the display device 1, the vehicle information (the tachometer segment bar 52A in this case) displayed on the tachometer segment display unit 42A (first display surface 11) and the tachometer scale drawing pattern 64B drawn and displayed on the sub-transparent dial plate 61B (second display surface 12) are combined and coordinated with each other to display engine speed of the vehicle. The display device 1 displays current engine speed by turning on and off each light source 42a corresponding to each of the plurality of tachometer segment bars 52A according to the current engine speed and turning on/displaying the tachometer segment bar 52A up to the position corresponding to the current engine speed in the tachometer scale drawing pattern 64B. Likewise, the display device 1 displays the water temperature gauge formed of the water temperature gauge segment display unit 42B and the sub-transparent dial plate 61C of the front face side display device 6, and the fuel gauge formed of the fuel gauge segment display unit 42C and the sub-transparent dial plate 61C of the front face side display device 6. The operation of each of the water temperature gauge and the fuel gauge is almost the same as that of the tachometer described above and thus will not be described.

On the other hand, the display device 1 is in a display mode as illustrated in FIG. 12, for example, when at least a part of the light sources 62 of the front face side display device 6 is turned off, namely a part of the second display surface 12 is in the hidden state. FIG. 12 illustrates a state where each light source 62 provided on the end face of the main transparent dial plate 61A is turned off, namely a part corresponding to the main transparent dial plate 61A on which the speedometer major scale drawing pattern 64A is drawn on the second display surface 12 is in the hidden state. In this case, the display device 1 turns off each light source 62 provided on the end face of the main transparent dial plate 61A and switches the speedometer major scale drawing pattern 64A on the second display surface 12 to the hidden state to be able to display the vehicle information in full size by using the entire display area of the image display surface 41a on the first display surface 11. FIG. 12 illustrates an example where the display device 1 displays a navigation image by using the entire display area of the image display surface 41a. At this time, the display device 1 is configured such that the extension direction L1 of the fine grooves 65 forming the speedometer major scale drawing pattern 64A and the like and the radiation direction L2 of the light of the back face side display device 4 cross at a predetermined angle, whereby the grooves 65 forming the speedometer major scale drawing pattern 64A can be less visible in the hidden state to thus be able to improve visibility of the vehicle information displayed on the first display surface 11. Note that the display device 1 can also switch the tachometer scale drawing pattern 64B, the water temperature gauge scale drawing pattern 64C and the fuel gauge scale drawing pattern 64D on the second display surface 12 to the hidden state by turning off each light source 62 provided on the end face of the sub-transparent dial plates 61B and 61C.

The display device 1 described above includes and employs the first display surface 11 and the second display surface 12 to display information, where the first display surface 11 displays the vehicle information while the second display surface 12 is disposed facing the first display surface 11 to transmit light, has the drawing pattern 64 drawn across the display area and outside the display area of the first display surface 11 when seen from the direction in which the second display surface is stacked on the first display surface 11, and can be switched to the displayed state in which the drawing pattern 64 is displayed and the hidden state in which the drawing pattern 64 is hidden.

Accordingly, the display device 1 can display the information while combining the vehicle information displayed on the first display surface 11 and the drawing pattern 64 displayed on the second display surface 12 which is disposed facing the first display surface 11 and transmits light. The display device 1 can therefore realize display having stereoscopic, novel appearance by combining the vehicle information on the first display surface 11 and the drawing pattern 64 on the second display surface 12. In this case, the display device 1 is configured such that the second display surface 12 disposed facing the first display surface 11 transmits light to be able to switchably display and hide the drawing pattern 64, whereby the vehicle information can be displayed while widely using the display area of the first display surface 11 by hiding the drawing pattern 64. The display device 1 can thus perform display in various modes according to circumstances. Moreover, the drawing pattern 64 on the second display surface 12 is drawn to span the display area and outside the display area of the first display surface 11 so that the display device 1 can display the drawing pattern 64 in a larger area outside the display area of the first display surface 11. As a result, the display device 1 can realize the visual effect that makes the display area look relatively large as a whole by combining the vehicle information on the first display surface 11 and the drawing pattern 64 on the second display surface 12. The display device 1 can therefore realize various displays with high design flexibility.

Moreover, according to the display device 1 described above, the first display surface 11 and the second display surface 12 display at least one piece of information in which the vehicle information and the drawing pattern 64 are coordinated. The display device 1 can therefore combine the vehicle information on the first display surface 11 and the drawing pattern 64 on the second display surface 12 and present the information having a sense of unity to the driver or the like.

Moreover, according to the display device 1 described above, the first display surface 11 includes the rectangular display area while the drawing pattern 64 includes the arc portion 64a jutting from the rectangular display area to the outside of the display area of the first display surface 11. The display device 1 can therefore have the novel appearance not bound by the image of the rectangular display area such as the display 41.

Moreover, according to the display device 1 described above, the first display surface 11 displays the pointer needle image 41b as the vehicle information, and the drawing pattern 64 is formed by including the speedometer major scale drawing pattern 64A provided around the pointer needle image 41b and pointed at thereby. The display device 1 can therefore display a variety of measured values (vehicle speed in this case) related to the vehicle by combining the pointer needle image 41b and the speedometer major scale drawing pattern 64A.

Moreover, according to the display device 1 described above, the second display surface 12 includes the indentation parts (the grooves 65 in this case) forming the drawing pattern 64 and can be switched to the displayed state in which the drawing pattern 64 is displayed by the light radiated from the light source 62 and the hidden state in which the drawing pattern 64 is hidden by turning off the light source 62. The display device 1 can therefore form the drawing pattern 64 by reflecting the light radiated from the light source 62 off of the indentation parts in the displayed state of the second display surface 12, and switch the drawing pattern 64 to be in the hidden state by turning off the light source 62.

Moreover, according to the display device 1 described above, the first display surface 11 displays the image of the vehicle information by the light polarized in one direction while the indentation parts formed on the second display surface 12 are the grooves 65 extending in the direction intersecting the polarization direction L3 of the polarized light. Here, the extension direction L1 of the grooves 65 and the polarization direction L3 cross at the aforementioned angle range.

The display device 1 can therefore display the drawing pattern 64 on the second display surface 12 by reflecting the light radiated from the light source 62 off of the grooves 65 forming the drawing pattern 64, and hide the drawing pattern 64 by turning off the light source 62. As a result, the display device 1 can display the design of the drawing pattern 64 on the front face side of the first display surface 11 and display the vehicle information on the first display surface 11 in the background and the design of the drawing pattern 64 by stereoscopically combining the two, whereby the stereoscopic, novel display as described above can be realized. The display device 1 can then make the design of the drawing pattern 64 less visible while allowing the first display surface 11 in the background of the transparent dial plate 61 to be seen through in the front face side display device 6 including the drawing pattern 64 formed of the fine grooves 65 when the light source 62 is turned off, and can make the design of the drawing pattern 64 appear when the light source 62 is turned on as needed. The display device 1 can ensure adequate visibility by making the grooves 65 forming the drawing pattern 64 less visible in the hidden state.

Note that the display device according to the aforementioned embodiment of the present invention is not limited to what is described in the aforementioned embodiment but can be modified in various ways within the range described in claims.

While one display 41 is included in the aforementioned description, two or more displays may be combined as well. The display device 1 described above may also be configured such that, for example, the polarization direction L3 of the display 41 is set at an angle to the vertical direction as long as the polarization direction L3 and the extension direction L1 are in the aforementioned relationship.

The segment display unit 42 includes the plurality of light sources 42a and the segment bar 52 drawn on the dial plate 5 according to the aforementioned description. However, it may also be configured as illustrated in FIG. 13 where a segment display unit 242 included in a display device 201 according to a variation includes a liquid crystal display 243 and the like and displays an image of the segment bar 52 (refer to FIG. 1 and the like) on an image display surface 243a of the liquid crystal display 243. In this case, the image display surface 243a forms a part of a first display surface 11. Also in this case, a final polarization direction of the liquid crystal display 243 of the display device 201 typically corresponds with the polarization direction L3. The segment display unit may also be formed of a dot matrix.

The back face side display device 4 includes the display 41 and the segment display unit 42 in the aforementioned description, but may include an analog instrument instead of or in addition to these components. The first display surface 11 in this case includes the analog instrument and a surface (surface on a front face side in the depth direction) of a dial plate of the instrument. Also in this case, the display device 1 may include a polarizing plate that polarizes light from a light source of the analog instrument in one direction (the polarization direction L3 in this case) between the light source of the analog instrument and the transparent dial plate 61 on which the grooves 65 are formed. The grooves 65 are formed while extending in the direction intersecting the polarization direction L3 of the polarized light in this case as well, so that the display device 1 can make the grooves 65 forming the drawing pattern 64 less visible in the hidden state of the second display surface 12.

Moreover, in the aforementioned description, the first display surface 11 includes the rectangular display area while the drawing pattern 64 includes the arc portion 64*a* jutting from the rectangular display area to the outside thereof of the first display surface 11, but it is not limited to such example. While for example the speedometer major scale drawing pattern 64A is drawn such that a part of the ring formed into a perfect circle lies off the display area of the image display surface 41*a* on both upper and lower sides thereof in the vertical direction and is drawn across the display area and outside the display area, it is not limited to such example. The part corresponding to the ring of the speedometer major scale drawing pattern 64A may instead be an elliptical shape or an arc shape formed by cutting off a part of a perfect circle or ellipse, for example. The drawing pattern 64 may include a drawing pattern drawn to lie off left and right in the width direction of the display area of the image display surface 41*a*. The drawing pattern 64 may also include a drawing pattern corresponding to the speedometer minor scale image 41*c*.

Moreover, while the back face side display device 4 and the front face side display device 6 form the speedometer, tachometer, water temperature gauge, and fuel gauge in the aforementioned description, it is not limited to such example. That is, the first display surface 11 displays the pointer needle image 41*b*, the speedometer minor scale image 41*c* and the segment bar 52 as the vehicle information whereas the second display surface 12 has the speedometer major scale drawing pattern 64A, the tachometer scale drawing pattern 64B, the water temperature gauge scale drawing pattern 64C and the fuel gauge scale drawing pattern 64D as the drawing pattern 64 in the aforementioned description, but it is not limited to such example. The drawing pattern 64 drawn on the second display surface 12 need only be drawn across the display area and outside the display area of the first display surface 11 and may thus be a drawing pattern associated with eco-driving, a drawing pattern indicating a warning, or a drawing pattern (an icon) representing the shape of a vehicle as well as have various shapes, for example. The display devices 1 and 201 may for example be configured to provide the drawing pattern representing the shape of a vehicle as the drawing pattern 64 on the second display surface 12, display an image of a position of a door that is open as the vehicle information on the image display surface 41*a* forming the first display surface 11, and superimpose these drawing pattern and image to display information on an open door position in the vehicle by coordinating the vehicle information and the drawing pattern 64 with each other.

Moreover, while the first display surface 11 and the second display surface 12 display at least one piece of information in which the vehicle information and the drawing pattern 64 are coordinated in the aforementioned description, it is not limited to such example as long as the drawing pattern 64 is drawn across the display area and outside the display area of the first display surface 11.

The groove 65 illustrated in FIG. 9 has the substantially V-shaped cross section forming an isosceles right triangle with the base angle approximately equal to 90° (degrees) in the aforementioned description, but it is not limited to such example. The groove 65 need not have the base angle equal to 90° (degrees) and may have a substantially V-shaped cross section that is not an isosceles triangle, for example. Moreover, while the drawing pattern 64 formed on the second display surface 12 is formed of the plurality of fine grooves 65 as the indentation parts in the aforementioned description, the indentation parts reflecting the light from the light source 62 may also be a light reflecting structure such as a plurality of fine dots or a printed layer having a plurality of fine indentation parts.

The display device according to the present invention can display information while combining vehicle information displayed on a first display surface and a drawing pattern displayed on a second display surface which is disposed facing the first display surface and transmits light. In this case, the display device is configured such that the second display surface disposed facing the first display surface transmits light and can be switched to display or hide the drawing pattern, whereby the vehicle information can be displayed while widely using the display area of the first display surface. Moreover, the drawing pattern on the second display surface is drawn to span the display area and outside the display area of the first display surface so that the display device can display the drawing pattern in a larger area outside the display area of the first display surface. As a result, the display device can realize the visual effect that makes the display area look relatively large as a whole with the vehicle information on the first display surface and the drawing pattern on the second display surface.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
a first display surface configured to display vehicle information in a display area and include a segment bar which transmits light;
a second display surface configured to be disposed facing the first display surface and to transmit light, the second display surface including a drawing pattern drawn across an inside and an outside of the display area when seen from a direction in which the second display surface is stacked on the first display surface, and be able to switch to a displayed state in which the drawing pattern is displayed and a hidden state in which the drawing pattern is hidden;
a dial plate disposed between the first display surface and the second display surface; and
a circuit board, wherein
the circuit board includes a plurality of light sources facing a side of the second display surface in a direction substantially perpendicular to a depth direction in which the second display surface transmits light from a back face side to a front face side,
the light sources are configured to transmit light through the side of the second display surface in a direction substantially perpendicular to the depth direction,
the display area is an area exposed through an opening provided in the dial plate, the display device displays information by the first display surface and the second display surface, and
a part of the drawing pattern is disposed over the opening such that the part of the drawing pattern overlaps the first display surface in the direction and the part of the drawing pattern is superimposed on the segment bar and serves as an indication part indicated by the segment bar.

2. The display device according to claim 1, wherein
the first display surface and the second display surface display at least one piece of information in which the vehicle information and the drawing pattern are coordinated with each other.

3. The display device according to claim 2, wherein
the first display surface includes a rectangular display area, and
the drawing pattern includes an arc portion jutting from the rectangular display area of the first display surface to the outside of the display area.

4. The display device according to claim 2, wherein
the first display surface displays an image of a pointer needle as the vehicle information, and
the drawing pattern includes an indication part which is provided around the image of the pointer needle and pointed at by the image of the pointer needle.

5. The display device according to claim 2, wherein
the second display surface includes an indentation part forming the drawing pattern and can switch to the displayed state in which the drawing pattern is displayed by light radiated from a light source and the hidden state in which the drawing pattern is hidden by turning off the light source.

6. The display device according to claim 1, wherein
the first display surface includes a rectangular display area, and
the drawing pattern includes an arc portion jutting from the rectangular display area of the first display surface to the outside of the display area.

7. The display device according to claim 6, wherein
the first display surface displays an image of a pointer needle as the vehicle information, and
the drawing pattern includes an indication part which is provided around the image of the pointer needle and pointed at by the image of the pointer needle.

8. The display device according to claim 6, wherein
the second display surface includes an indentation part forming the drawing pattern and can switch to the displayed state in which the drawing pattern is displayed by light radiated from a light source and the hidden state in which the drawing pattern is hidden by turning off the light source.

9. The display device according to claim 1, wherein
the first display surface displays an image of a pointer needle as the vehicle information, and
the drawing pattern includes an indication part which is provided around the image of the pointer needle and pointed at by the image of the pointer needle.

10. The display device according to claim 9, wherein
the second display surface includes an indentation part forming the drawing pattern and can switch to the displayed state in which the drawing pattern is displayed by light radiated from a light source and the hidden state in which the drawing pattern is hidden by turning off the light source.

11. The display device according to claim 1, wherein
the second display surface includes an indentation part forming the drawing pattern and can switch to the displayed state in which the drawing pattern is displayed by light radiated from a light source and the hidden state in which the drawing pattern is hidden by turning off the light source.

12. The display device according to claim 11, wherein
the first display surface displays an image of the vehicle information by light polarized in one direction, and
the indentation part is a groove which is formed on the second display surface and extends in a direction intersecting a polarization direction of the polarized light.

13. The display device according to claim 1, wherein
the second display surface comprises a plurality of grooves therein.

14. The display device according to claim 13, wherein
the grooves are arranged along the direction and oriented at angles greater than 75° and less than 105°.

15. The display device according to claim 13, wherein
the grooves comprise a pitch of 0.5 μm in the direction and a height of 0.25 μm in the depth direction.

16. The display device according to claim 1, wherein the part of the drawing pattern, disposed over the opening and overlapping the first display surface in the direction, is a part of the drawing pattern drawn across the inside of the display area, and
a second part of the drawing pattern, which is drawn across the outside of the display area, is disposed overlapping, in the direction, a plurality of segment bar openings in the dial plate, and not overlapping the opening in the direction.

17. The display device according to claim 1, wherein in both of a width direction and a vertical direction, each perpendicular to each other and to the direction in which the second display surface is stacked on the first display surface, the dial plate is larger than both of the first display surface and the second display surface.

18. The display device according to claim 1, wherein the drawing pattern comprises, in the displayed state, a speedometer overlapping the first display surface which is an electronic display displaying at least a needle of the speedometer,
wherein in the hidden state, the drawing pattern is transparent and the first display surface displays information other than the needle of the speedometer, the information other than the needle of the speedometer being absent from the first display surface in the displayed state of the drawing pattern.

* * * * *